May 25, 1943.　　　P. D. SULOFF　　　2,320,053
MOTOR DRIVE
Filed April 5, 1941　　　3 Sheets-Sheet 1

Inventor
Paul D. Suloff

May 25, 1943.  P. D. SULOFF  2,320,053
MOTOR DRIVE
Filed April 5, 1941  3 Sheets-Sheet 2
Fig. 3
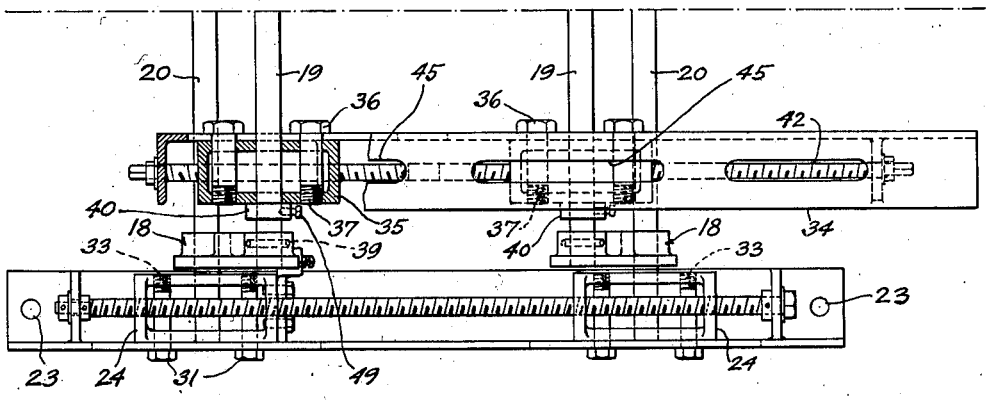
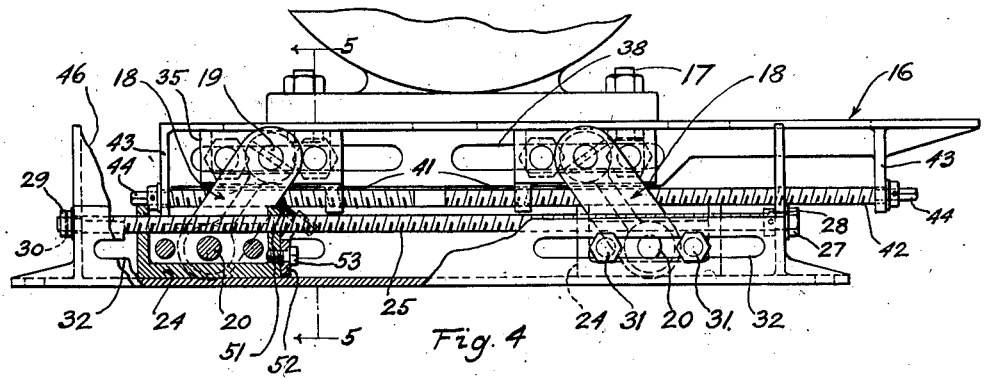
Fig. 4
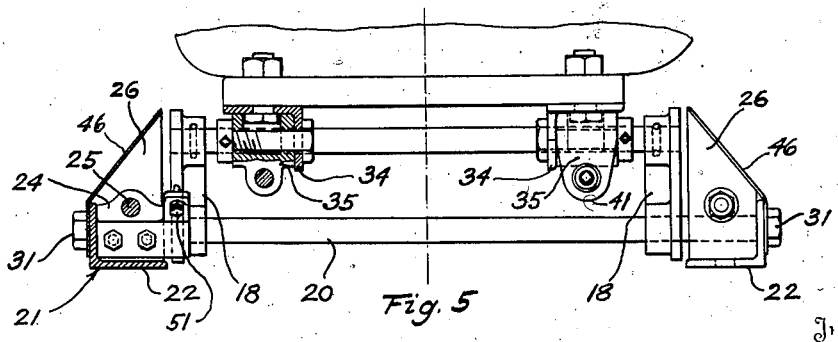
Fig. 5
Inventor
Paul D. Suloff
By
Attorney Inventor
Paul D. Suloff Attorney Patented May 25, 1943

2,320,053

UNITED STATES PATENT OFFICE 2,320,053

MOTOR DRIVE

Paul D. Suloff, Akron, Ohio, assignor to Wingfoot Corporation, Akron, Ohio, a corporation of Delaware Application April 5, 1941, Serial No. 387,028

15 Claims. (Cl. 74—242.12)

The present invention relates to motor drives in which a motor (driving unit) is used to drive a machinery driven unit or the like through the intermediacy of a pulley on the motor and a pulley connected to the machinery to be driven, the pulleys being connected by a driving belt, usually of the flat type. In using the term "motor" it is to be understood that I do not wish to confine myself to an electric motor, although that is the most practical for the purposes of this invention. It would however be perfectly within the scope of this invention to mount on the motor support to be hereinafter described a motor of the gasoline or steam type, or any other suitable type imparting rotary motion to a driving pulley. It is also possible to put the driven element instead of the motor on the base forming my invention.

It is well known that in belt drives of this character, and in fact in the driving of any machinery, there is usually a starting torque that is greater than the normal operating torque used to drive the machinery in normal operation. It is also well known that in such drives certain other peak loads occur which must be taken care of by the driving unit, in this case an electric motor. It is therefore necessary in connecting up a motor to a piece of machinery that the motor be capable of driving the machinery at its peak load, and that the elements which make up the driving mechanism must be strong enough to stand up under these conditions.

In a belt drive, for example, if the machinery to be driven is one that requires a high torque for starting and a relatively low amount of torque during operation, the customary procedure is to tension the belt a sufficient amount so that slippage will not occur during the starting of the machinery, as this slippage would not only tend to wear out the belt more quickly but would cause the belt to disengage itself from one of the pulleys.

There are a great number of machines in which the motor drive is started and stopped frequently and in such case a considerable amount of slippage would result if the belt were not tightened properly. If the belt is tightened sufficiently to take care of the maximum load, then there is too much tension in the belt during normal operation and the belt life is shortened. Tension is a fourth power factor in belt life so that savings in tension are multiplied in belt life.

It is therefore a primary object of this invention to provide a support for a motor (in this case an electric motor) which will automatically adjust the tension of the belt both for normal operation and for peak loads. This tension, however, is regulated to such an extent at all times that the belt is never tensioned too much in excess of that required at any particular instant. The support may be used to carry the driven unit (machinery) instead of the driving unit (motor) if desired.

Another object of this invention is to provide a pivoted motor support on which the motor is mounted, but in which the instantaneous center of rotation for the mass of the motor is changed according to the load requirements of the machinery being driven.

Another object of this invention is to provide means for bodily shifting the motor to change the initial tension in the belt (under no-load conditions) to effect the desired tension in the belt.

Still another object of this invention is to permit adjustment of the position of the instantaneous center of rotation of the mass of the motor without changing the initial belt tension.

Other objects of this invention will appear hereinafter as the description thereof proceeds, the novel features, arrangements and combinations being celarly set forth in the specification and in the claims thereunto appended.

In the drawings,

Fig. 3 is a plan view of one-half of the base or motor mounting;

Fig. 4 is an elevational view of one side of the motor support with parts broken away for the sake of clearness; and Fig. 5 is an end view showing the left-hand side of my device in section along the line 5—5 in Fig. 4 and the right-hand side in end elevation looking from the right in Fig. 4;

In my improved drive the center of rotation for the mass of the motor is an imaginary point in space and therefore imposes no practical limitations on the diameter of the pulley which may be used on the motor, nor on the width of the pulley. There is also no obstruction around the driving pulley of such a nature as to prevent a quick change of the driving belt. The moving parts of my motor support, and in fact all of the parts thereof as illustrated herein, are below the base of the motor itself, if one considers the usual driving condition, as in Figs. 1 and 2. However, it is possible that such a drive may be suspended on brackets from a ceiling or from a side wall without changing the functioning of the drive and such brackets can readily be designed so as not to obstruct the motor pulley whereby the advantages of this drive in that respect are not impaired, or the support can be mounted upside down as will be hereinafter described.

In general the operation of my improved motor support is such that normally under no-load conditions the instantaneous center of rotation of the motor is relatively close to a vertical line through the center of mass of the motor whereby the mass of the motor does not impart a high tension to the belt. However, when the motor is started, considerable power is necessary to overcome the starting torque and, while the motor is of such design as to meet that power requirement, the initial belt tension is not sufficient to give the proper belt tension required to overcome the starting torque without slippage. The support upon which the motor is mounted is therefore pivoted in such a way that the initial pull on the motor as the motor is started rocks the motor about its instantaneous center, and in so doing moves the instantaneous center of rotation a greater distance away from the aforesaid vertical line through the center of mass of the motor. The effectiveness of the weight of the motor therefore to impart tension on the belt is increased and as a result the belt will not slip. As soon as the initial starting torque is over and the motor is operating the machinery under normal load the instantaneous center of rotation moves back toward its original position, but not to its original position. By adjustments hereinafter described the path of the instantaneous center of rotation may be varied to suit the requirements of any particular device.

Figure 1:
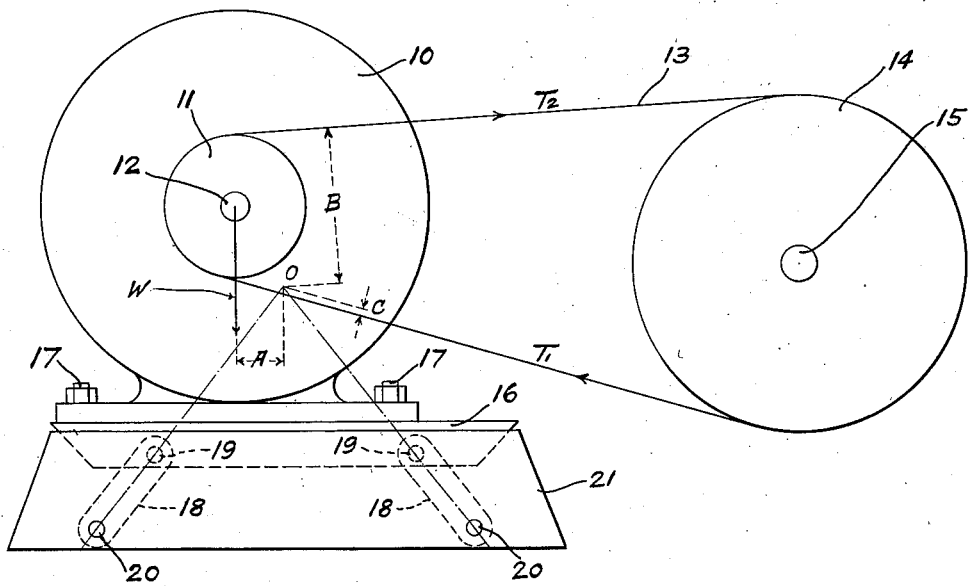
Fig. 1 is a schematic view illustrating one form of my invention, the parts in this view being shown under no-load conditions and with the motor at rest.
Figure 2:
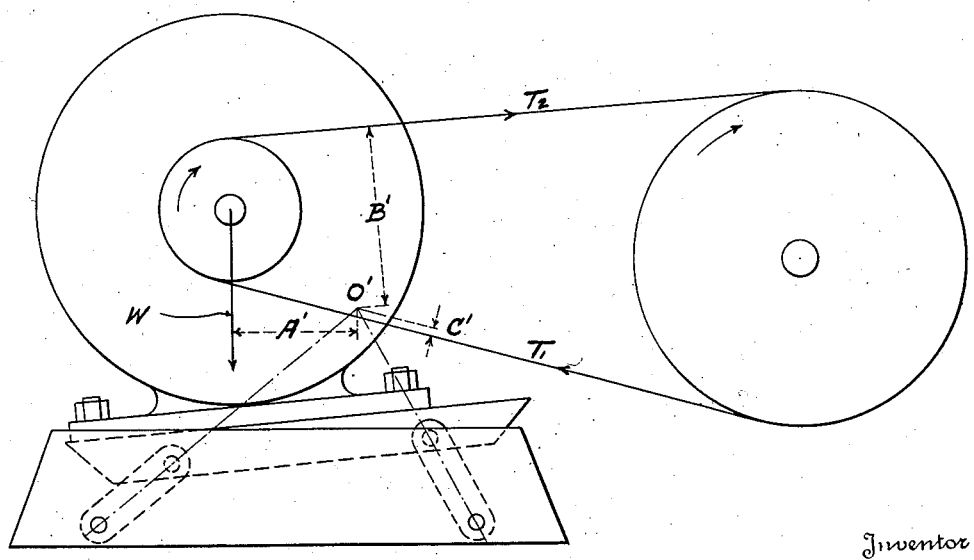
Fig. 2 is a similar view to that shown in Fig. 1 but showing the position of the parts under load.

Referring now to Figs. 1 and 2 in particular, I have shown my invention schematically in the no-load and load positions respectively. The belt drive comprises a motor 10 having a pulley 11 mounted on the armature shaft 12 of the motor. A belt 13 trained over a pulley 14 mounted on a shaft 15 and also over the pulley 11 imparts rotative movement to the shaft 15 when the motor 10 is actuated. While not shown in the drawings, it is understood that the shaft 15 is connected to any kind of machinery that is to be driven and it is not believed necessary to show any particular machine being driven from the shaft 15 as that is immaterial to the invention. The invention relates to providing means for imparting to the shaft 15 the necessary motion under all conditions without unduly tensioning the belt.

The motor 10 is mounted on a platform 16 and is secured thereto as by the bolts 17. As will be described in connection with Figs. 3-5 inclusive the motor is preferably adjustably mounted on the platform 16, and it is to be assumed that in Figs. 1 and 2 the motor has been adjusted to the proper position on the platform 16.

The platform 16 is supported by a pair of links 18 which are pivoted thereto as at 19 and pivoted at 20 to the base 21, the latter being suitably secured rigidly to a supporting structure such as a floor pedestal or the like. The links 18 permit the platform 16 to rock freely unless restrained by some other force and in this instance this other force is the tension in the belt 13. The motor is mounted on the platform 16 so that its center of mass is located to the left of what I shall refer to as the instantaneous center of rotation 0, to distinguish from a fixed center of rotation. Naturally the weight of the motor tensions the belt 13 and this force tends to prevent rocking movement of the platform 16 to the left, or in a counter-clockwise direction, while the weight of the motor prevents rocking movement of the platform to the right.

Adjustments are not shown in Figs. 1 and 2 but will be referred to more in connection with Figs. 3-5, inclusive. In Figs. 1 and 2 we will therefore assume that the parts have been adjusted to the correct positions for the drive about which this invention is concerned. The center lines of the links 18 extended intersect at the point 0 and this point 0 is the instantaneous center of rotation about which the motor 10 tends to rotate bodily. The center of mass acts along the perpendicular line W at a lateral distance A from the instantaneous center of rotation 0, thus the tension in the belt 13 is determined by the weight of the motor and the lever arm, which in this instance is the lever arm A. This gives the normal no-load tension in the belt.

In Fig. 2 I have illustrated my drive under load conditions. As soon as the motor is rotated in the direction indicated by the arrow in Fig. 2 the tension $T_1$ is increased and the tension $T_2$ is decreased.

Since the summation of moments about the point 0 is zero then it follows that $$\Sigma M_0 = B \cdot T_2 + C \cdot T_1 + A \cdot W = 0$$

Note: These forces are to be considered plus (+) if in a clockwise direction and minus (−) if in a counter-clockwise direction.

When there is an increase in load the value $T_1$ increases and $T_2$ decreases but, due to the smaller lever arm of $T_1$, the sum of the moments tending to rock the motor clockwise is decreased and therefore the moment AW which is now greater than $C \cdot T_1 + B \cdot T_2$ rocks the motor counter-clockwise until a new equilibrium is obtained; i. e., until $C \cdot T_1 + B \cdot T_2$ equals the value AW. This increases the distance between pulley centers and as a result increases the tension in the belt so that there is less chance of slippage. In starting, the tension $T_1$ becomes quite great, momentarily at least, and the motor rocks counter-clockwise. As soon as the motor has overcome the starting torque of the driven mechanism the load becomes less than $T_2$ increases while $T_1$ decreases. This causes the motor to rock about the instantaneous center 0 in a clockwise direction to further reduce the tension on the belt due to the fact the center 0 moves closer to the motor to reduce the distance A. Thus, there is a lessened tension in the belt which is sufficient to drive the machinery without undue slippage, and it will be apparent that the tension of the belt is not much more than that which is required for the different load requirements.

It is preferable but not necessary that the instantaneous center of rotation remain at a point approximately just inside the run of the tight side T' of the belt. There is a minimum height of the motor shaft above the base pivot plane below which no belt tightening will occur, and I have found it advisable to keep the minimum height at least as great as the height of the instantaneous center of rotation of the motor. The adjustments provided for the initial setting of the instantaneous center of rotation and which determines the path of movement thereof are more clearly illustrated in the detailed description of a particular embodiment of my invention shown in Figs. 3–5 inclusive.

In Figs. 3–5 inclusive the same reference characters refer to similar parts schematically shown in Figs. 1 and 2, but the base is reversed, that is the driven element would be to the left instead of to the right as in Figs. 1 and 2. The base 21 is shown as comprising two angle brackets 22 which in operation are secured to a fixed support by bolts extending through the hole 23 therein. In each of these angle brackets there are slidably mounted pairs of blocks 24 which are threaded to receive the threaded shafts 25 which in turn are rotatably mounted in the webs 26 integral with the brackets 22. Each shaft is held against longitudinal movement by the head 27 on the shaft and a collar 28 pinned to the shaft or by the collar 29 also pinned thereto, as by a pin 30.

The threads on the shaft 25 all extend in the same direction and therefore rotation of the shaft 25 moves the blocks 24 in unison one way or the other along the angle bracket 22 to set the center distance for the particular belt being used or to correct for stretch in the belt. When the proper position of adjustment has been obtained for the blocks they are locked in that position by means of the bolts 31, which extend through the slots 32 in the bracket 22 and are threaded into the blocks as at 33 (see particularly Fig. 3).

The platform indicated generally as 16 comprises a pair of angle brackets 34 and in these brackets are slidably mounted pairs of blocks 35. These blocks may be locked in any adjusted position by the bolts 36 threaded into the blocks 35, as at 37. These bolts 36 extend through slots 38 in the angle brackets 34. The pairs of links 18 on opposite sides of the base are pivotally mounted on the rods 20 which extend into the blocks 24 and are securely held therein against rotation or longitudinal movement with respect thereto. These rods 20, together with the brackets 22 and connecting blocks 24 form a rigid base for my invention when the bolts 31 are tightened. The upper ends of the links 18 receive the ends of the rods 19 and these rods are pinned thereto by the pins 39, whereby the rods are non-rotatably held within these links, but these rods 19 in turn extend through the blocks 35 and are rotatable therein so that the platform 16 may rock in the manner indicated in connection with the schematic views of Figs. 1 and 2. Lateral movement of the brackets 34 and blocks 35 is prevented by the collars 40 held on the rods 19 by set screws 49 which engage the outer sides of the blocks 35. The angle brackets 34 may be slid along the rods 19 for different widths of motor bases.

The lower edges of the blocks are provided with lugs 41 through which there are threaded shafts 42 rotatably mounted in the webs 43 on the brackets 34. The shafts 42 are provided with squared ends 44, which may be used to rotate the shaft to effect the longitudinal adjustment of the blocks 35 when the bolts 36 are loosened to thereby permit the blocks 35 to slide in the angle brackets 34. It will be noted from an inspection of Fig. 4 that the shaft 42 is oppositely threaded at the opposite ends thereof so that upon rotation of the shaft 42 the blocks 35 are moved toward or away from each other. This causes the links 18 to change their angular position with respect to each other and this raises or lowers the instantaneous center of rotation 0 for the purpose of bringing that instantaneous center to the desired position which, as already explained, is preferably close to and just inside the run $T_1$ of the belt.

The motor position on the platform 16 is adjusted by loosening the nuts on the bolts 17, which bolts extend through the slots 45 in the upper surface of the brackets 34. By this adjustment the position of the motor with respect to the instantaneous center of rotation 0 may be properly taken care of.

The brackets 21 are preferably provided with shields 46 which are secured to the angle brackets and extend upwardly and inwardly over the blocks 24 and threaded shaft 25. The shields are provided with slots commensurate with the slots 32.

In making an installation of this kind the bolts 36 are loosened and the shafts 42 rotated to adjust the angular positions of the links 18 to determine the instantaneous center 0 for a given installation. Next, the base comprising the rods 20 and brackets 22, is firmly secured to a rigid support, such as the floor of a building, by means of suitable bolts or lag screws or the like extending through holes 23 to fix the base in a position approximately that desired. The bolts 31 are then loosened and the blocks 24 are moved longitudinally by rotating the shaft 25 whereby to make the final adjustment for proper center distance between shafts 12 and 15 and to thereby locate the initial, no-load position of the point 0. Usually the angular position of the arms 18 is determined by adjustment in the shop and in that event it is only necessary to adjust the base to locate the position 0 at the proper initial position when the installation is being made. It is also necessary to adjust the position of the motor on the platform 16 to position the center of means thereof the proper distance from the initial instantaneous center of rotation to obtain the proper initial moment AW. When all adjustments are made the platform is preferably horizontal under no-load conditions and the motor is at the proper distance A away from the instantaneous center of rotation. If, after the drive has been in operation some time, the belt has taken up a permanent stretch, causing the platform 16 to tilt under no-load conditions, the platform may be brought back to a horizontal position merely by adjusting the blocks 24 by the shafts 25 in the manner previously described.

In order to provide simultaneous rotation for shafts 25, the same may be connected by a suitable chain running over equal diameter sprockets on the shafts and a similar arrangement can be used for giving simultaneous rotation of the shafts 42. Suitable gearing may also be used.

Figure 6:
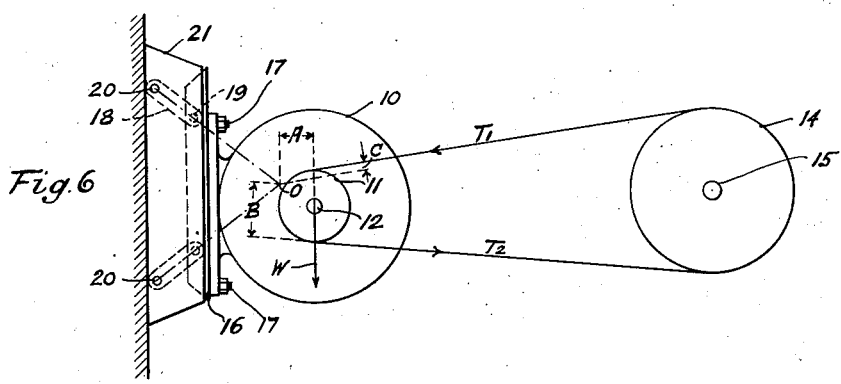
Figs. 6 and 7 illustrate the use of my invention on a vertical wall.
Figure 7:
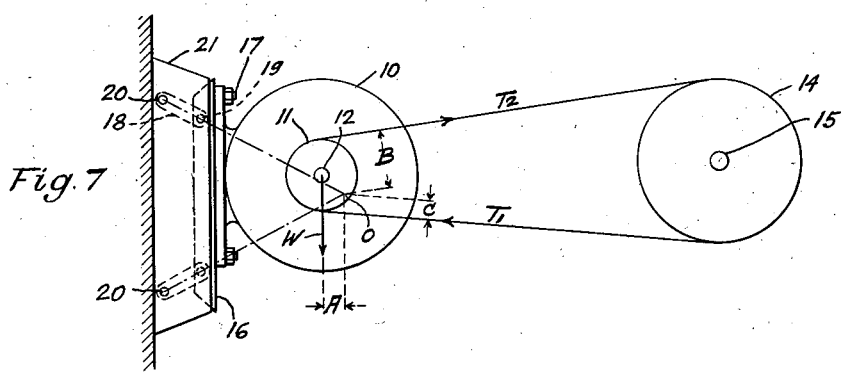
Figure 8:
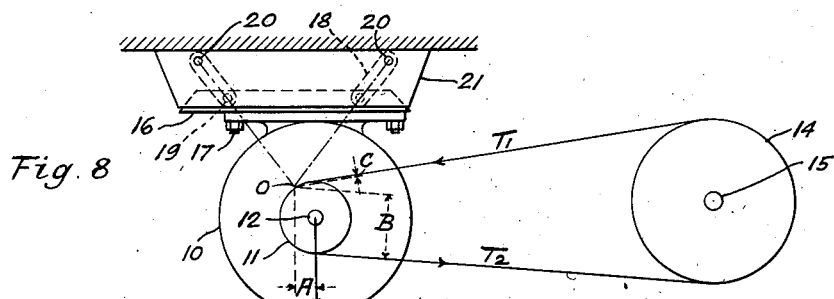
Figs. 8 and 9 illustrate the use of my invention secured to the ceiling.
Figure 9:
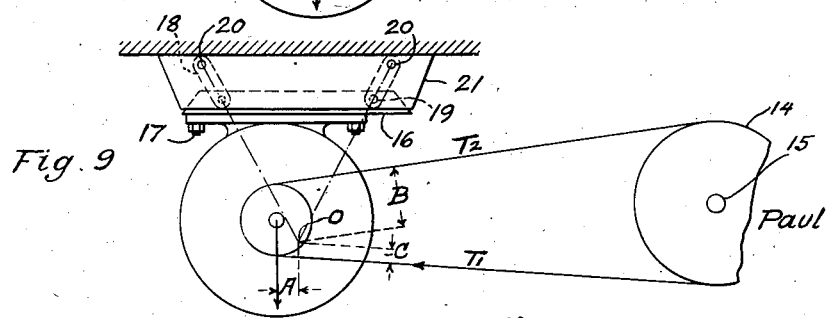

In Figs. 6 and 7 my invention is shown applied to a side wall and in Figs. 8 and 9 it is shown applied to the ceiling. Of course it is obvious that additional positions for the motor support are possible by mounting same on a bracket on the wall or ceiling with the base horizontal as in Figs. 1–5 inclusive. It is obvious from the foregoing detailed description of Figs. 1–5 inclusive how the weight of the motor tends to increase the tension in the belt in each of these modifications as the load increases.

In Figs. 6–9 inclusive the same reference characters refer to corresponding parts in Figs. 1–5 inclusive. The amounts and direction of some of the moments are in some cases different, but the general effect is to tighten the belt when there is an increase in the load.

A screw 51 threaded into a bracket 52 secured to the block 24, by bolt 53 acts as a stop to prevent the motor from being rocked too much counterclockwise as viewed in Fig. 4 or clockwise in Fig. 1 in which the stop is not shown. Similar limiting screws can be used to limit movement in the opposite direction.

I do not wish to limit my invention to the particular arrangement and combination of parts herein shown as various modifications thereof can be made within the purview of this invention without departing from the scope of the claims hereinafter presented. For instance, it is not necessary to build the motor support in the manner shown and, instead of using the shafts 25 and 42 to effect longitudinal adjustment of the locks 24 and 35, one can normally adjust these blocks and lock them in position as by the bolts 31.

Having thus fully described my invention, what I claim and desire to secure by Letters Patent of the United States is:

1. A motor support comprising a base, a motor mounting bracket, means for adjustably mounting a motor on the bracket, and at least one pair of links pivotally connected to said bracket and base for free swinging movement, the pivotal connections being such that the links swing on parallel axes and the pivotal connections of said links with said base being spaced a materially different distance apart than the pivotal connections of said links with said bracket.

2. A motor support comprising a base, a motor mounting bracket, at least one pair of links pivotally connected to said bracket and base for free swinging movement, the pivotal connections being such that the links swing on substantially parallel axes and the pivotal connections of said links with said base being spaced a greater distance apart than the pivotal connections of said links with said bracket, and means for changing the points of pivotal connections between the links and the base.

3. A motor support comprising a base, a motor mounting bracket, at least one pair of links pivotally connected to said bracket and base for free swinging movement, the pivotal connections being such that the links swing on substantially parallel axes and the pivotal connections of said links with said base being spaced a materially different distance apart than the pivotal connections of said links with said bracket, and means for changing the position of the pivotal connections between said links and said bracket to vary the aforesaid distance.

4. A motor support comprising a base, a motor mounting bracket, and at least one pair of links pivotally connected to said bracket and base for free swinging movement, the pivotal connections being such that the links swing on substantially parallel axes and the pivotal connections of said links with said base being spaced a materially different distance apart than the pivotal connections of said links with said bracket, and means for adjusting the positions of some of said pivotal connections to vary the angular relation between the said links.

5. A motor support comprising a base, a motor mounting bracket, and at least one pair of links pivotally connected to said bracket and base for free swinging movement, the pivotal connections being such that the links swing on substantially parallel axes and the pivotal connections of said links with said base being spaced a materially different distance apart than the pivotal connections of said links with said bracket, and means for adjusting the positions of each of said pivotal connections to vary the angular relation between the said links.

6. A motor drive comprising a driving and a driven shaft, a flexible endless driving element connecting said shafts in driving relation, a movable bracket, means for mounting one of said shafts on said movable bracket, a base, a pair of links, each link being pivotally connected at one end to said base and at its other end to said bracket, the links being so pivoted as to be in non-parallel relation with each other, said shaft on said bracket being mounted on said bracket in such a position that the bracket under non-driving conditions tends to rock in a direction to tighten said flexible driving element.

7. A motor drive comprising a driving and a driven shaft, a belt connecting said shafts in driving relation, a movable bracket, means for mounting one of said shafts on said movable bracket, a base, a pair of links, each link being pivotally connected at one end to said base and at its other end to said bracket, the links being so pivoted as to be in non-parallel relation with each other, said shaft on said bracket being mounted on said bracket in such a position that the bracket tends to rock in a direction to tighten said belt when the torque on the motor is increased.

8. A motor drive comprising a driving and a driven shaft, a belt connecting said shafts in driving relation, a movable bracket, means for mounting one of said shafts on said movable bracket, a base, at least one pair of links connecting said base and bracket, pivotal connections between one end of each link of said pair and said base, pivotal connections between the other end of each link and said bracket, the links being so pivoted as to be in non-parallel relation with each other, said shaft on said bracket being mounted on said bracket in such a position that the bracket under non-driving conditions tends to rock in a direction to tighten said belt, the angular relation of said links being such that under driving conditions the pull summation of the tension in the belt tends to further rock said bracket to increase the tension in said belt.

9. A motor drive comprising a driving and a driven shaft, a motor for directly actuating said driving shaft, pulleys on said shafts, a belt connecting said pulleys in driving relation, a movable bracket, means for mounting said motor and the shaft on said movable bracket, a base, at least one pair of links connecting said base and bracket, pivotal connections between the end of each link of said pair and said base, pivotal connections between the other end of each link and said bracket, said links being so pivoted as to be in non-parallel relation with each other and so that the intersection of the longitudinal axes of the links is substantially coincident with the plane of the tight side of the belt.

10. A belt drive comprising a driving pulley and a driven pulley, a pair of substantially parallel shafts on which said pulleys are mounted respectively, a belt trained over said pulleys to drive said driven pulley when the said driving pulley is actuated, power means for actuating said driving pulley and directly connected thereto, a movable support upon which one of said pulleys is mounted, a base for said support, and at least one pair of non-parallel links each link of the pair being pivoted to the support and to the base respectively, on pivots extending in the same general direction as said shafts, the said links being unrestrained for angular movement within substantial limits whereby said support is free to rock about an instantaneous center in space defined by the intersection of lines drawn through the pivots of the respective links.

11. A belt drive comprising a driving pulley and a driven pulley, a pair of substantially parallel shafts on which said pulleys are mounted respectively, a belt trained over said pulleys to drive said driven pulley when the said driving pulley is actuated, power means for actuating said driving pulley and directly connected thereto, a movable support upon which one of said pulleys is mounted, a base for said support, at least one pair of non-parallel links each link of said pair being pivoted at one end to the support and at its other end to the base respectively, on pivots extending in the same general direction as said shafts, the said links being unrestrained for angular movement within substantial limits whereby said support is free to rock about an instantaneous center in space defined by the intersection of lines drawn through the pivots of the respective links, and means for adjusting at least some of said pivotal connections whereby the position of said instantaneous center relative to the center of mass for the power means may be changed.

12. A belt drive comprising a driving pulley and a driven pulley, a pair of substantially parallel shafts on which said pulleys are mounted respectively, a belt trained over said pulleys to drive said driven pulley when the said driving pulley is actuated, power means for actuating said driving pulley and directly connected thereto, a movable support upon which said driving pulley and motor are mounted, a base for said support, and at least one pair of non-parallel links each link of said pair being pivoted at one end to the support and at its other end to the base, on pivots extending in the same general direction as said shafts, the said links being unrestrained for anguluar movement within substantial limits whereby said support is free to rock about an instantaneous center in space defined by the intersection of lines drawn through the pivots of the respective links, and means for adjusting the angular relationship of the links.

13. A belt drive comprising a driving pulley and a driven pulley, a pair of substantially parallel shafts on which said pulleys are mounted respectively, a belt trained over said pulleys to drive said driven pulley when the said driving pulley is actuated, power means for actuating said driving pulley and directly connected thereto, a movable support upon which said driving pulley and motor are adapted to be mounted, a base for said support, and at least one pair of non-parallel links each link being pivoted at one end to the support and at its other end to the base on pivots extending in the same general direction as said shafts, the said links being unrestrained for angular movement within substantial limits whereby said support is free to rock about an instantaneous center in spaced defined by the intersection of lines drawn through the pivots of the respective links, and means mounting the driving pulley and motor on the support so that an increase in the torque of the motor rocks the support to increase the tension in the belt.

14. A motor and support combination comprising a base, a motor mounting bracket, at least one pair of links pivotally connected to said bracket and base for free swinging movement, the pivotal connections being such that the links swing on parallel axes and the pivotal connections of the links with said base being spaced a materially different distance apart than the pivotal connections of said links with said bracket, a motor, and means mounting the motor in an offset position on the bracket so that a vertical line through the center of mass of the motor passes in offset relation to the same side of the point of intersection of the center lines of the links when the motor is not being operated and during the entire operation of the motor.

15. A motor and support combination comprising a base, a motor mounting bracket, a pair of links, each link of the pair being pivotally connected at one end to said bracket and at its other end to said base for free swinging movement, the pivotal connections being such that the links swing on parallel axes and the pivotl connections of said links with said base being such as to place the links in non-parallel positions with respect to each other, a motor mounted on the bracket, and means for changing the lateral spacing between the point of intersection of the center lines of the links and a vertical line extending through the center of mass of the motor.

PAUL D. SULOFF.